United States Patent
Saga

(10) Patent No.: US 7,672,580 B2
(45) Date of Patent: Mar. 2, 2010

(54) IMAGING APPARATUS AND METHOD FOR CONTROLLING DISPLAY DEVICE

(75) Inventor: Yoshihiro Saga, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/369,157

(22) Filed: Mar. 6, 2006

(65) Prior Publication Data

US 2006/0210264 A1    Sep. 21, 2006

(30) Foreign Application Priority Data

Mar. 17, 2005  (JP) .............................. 2005-077161
Jan. 24, 2006  (JP) .............................. 2006-015096

(51) Int. Cl.
*G03B 3/00* (2006.01)

(52) U.S. Cl. ...................... 396/128; 396/287
(58) Field of Classification Search ................. 396/287, 396/128
See application file for complete search history.

(56) References Cited

U.S. PATENT DOCUMENTS

| | | | |
|---|---|---|---|
| 5,031,049 A * | 7/1991 | Toyama et al. ............... | 348/352 |
| 5,982,912 A | 11/1999 | Fukui | |
| 6,816,611 B1 | 11/2004 | Hagiwara | |
| 2003/0071908 A1 | 4/2003 | Sannoh | |
| 2004/0207743 A1 | 10/2004 | Nozaki | |
| 2004/0228614 A1 | 11/2004 | Yokoyama et al. | |

FOREIGN PATENT DOCUMENTS

| | | |
|---|---|---|
| CN | 1254145 A | 5/2000 |
| CN | 1291763 A | 4/2001 |
| CN | 1551019 A | 12/2004 |
| JP | 05-89244 A | 4/1993 |
| JP | 07-231733 A | 9/1995 |
| JP | 09-251534 A | 9/1997 |
| JP | 10-162118 A | 6/1998 |
| JP | 10-232934 A | 9/1998 |
| JP | 2000-48184 A | 2/2000 |
| JP | 2003-107335 A | 4/2003 |
| JP | 2004-013871 A | 1/2004 |
| JP | 2004-208113 A | 7/2004 |
| JP | 2004-317699 A | 11/2004 |
| JP | 2004-320286 A | 11/2004 |
| JP | 2004-320287 A | 11/2004 |

* cited by examiner

*Primary Examiner*—Reena Aurora
(74) *Attorney, Agent, or Firm*—Canon U.S.A. Inc., I.P. Division

(57) ABSTRACT

An imaging apparatus automatically detects an object and displays information on a display device based on a comparison between detected data and memorized (stored) data. The imaging apparatus includes a detecting circuit and a memorizing circuit. The detecting circuit detects the object based on the image data produced from an output of an imaging element and calculates a feature value representing a feature of the detected object. The memorizing circuit memorizes the feature value calculated by the detecting circuit. A feature value calculated by the detecting circuit based on the image data displayed on the display device is compared with the feature value memorized in the memorizing circuit. The display device displays information relating to the comparison result.

29 Claims, 11 Drawing Sheets

FIG.11

| OBJECT ID | OBJECT 1 | OBJECT 2 | OBJECT 3 |
|---|---|---|---|
| FEATURE VALUE | (X1, Y1) | (X2, Y2) | (X3, Y3) |
| CUMULATIVE PHOTOGRAPHING NUMBER | 3 | 1 | 4 |
| FRAME NUMBER (S) | 1<br>3<br>4 | 1<br>4 | 1<br>2<br>3<br>5 |

FIG.12

| FRAME NUMBER | 1 | 2 | 3 | 4 | 5 |
|---|---|---|---|---|---|
| STORAGE ADDRESS | aaaa | bbbb | cccc | dddd | eeee |
| TIME | 7:00 | 7:03 | 7:04 | 7:06 | 7:09 |
| DATE | 01/01/2004 | 01/01/2004 | 01/01/2004 | 01/01/2004 | 01/01/2004 |
| SHOOTING MODE | AUTO | AUTO | NIGHT | PORTRAIT | AUTO |

IMAGING APPARATUS AND METHOD FOR CONTROLLING DISPLAY DEVICE

BACKGROUND OF THE INVENTION

1. Field of the Invention

The present invention relates to an imaging apparatus and a method for controlling a display device.

2. Description of the Related Art

There are conventional techniques capable of detecting a face image from an entered image using a method that can automatically detect a face region by detecting a characteristic portion or a flesh color portion of an object face from object image data.

For example, the conventional technique discussed in Japanese Patent Application Laid-open No. 2004-013871 can register particular reference image data and can determine whether or not newly entered image data agrees with the reference image data.

For example, the conventional technique discussed in Japanese Patent Application Laid-open No. 09-251534 can identify a face region by calculating a correlation value between the image data of a pre-registered face and the image data of an object face.

Furthermore, the conventional technique discussed in Japanese Patent Application Laid-open No. 10-162118 can divide image data into plural frequency-band regions to limit a region including a face and can calculate a correlation value between the data in the limited region and pre-registered face image data.

These conventional techniques can be applied to cameras.

The conventional technique discussed in Japanese Patent Application Laid-open No. 2003-107335 can automatically detect a main object from image data using a shape analysis or the like and can display an auto-focus (AF) area of a detected main object. Then, the focus adjustment processing can be applied to the AF area.

The conventional technique discussed in Japanese Patent Application Laid-open No. 2004-317699 can discriminate a face region (i.e., a main object area) by detecting a feature point from image data and can set an AF area in accordance with the detected region.

Furthermore, the conventional technique discussed in Japanese Patent Application Laid-open No. 2004-320286 can discriminate a face region by detecting a feature point from image data and can drive a zooming mechanism in accordance with the size of the detected region.

In general, the movement of a sports player is very moving (i.e., rapid) and accordingly it is very difficult to find out or track a particular player through an optical finder or on a back monitor of an imaging apparatus.

A photographer may be required to take pictures for all of participants, when the photographer joins an indoor or outdoor event, such as a buffet-style dinner party or a day camp. However, many of the participants in such an event are unknown to the photographer. Therefore, it is generally difficult for the photographer to check and confirm whether or not all of the participants have been photographed.

According to the above-described conventional techniques, face image data of the participants can be registered beforehand as reference images and can be compared with photographed image data to search for a participant who has not been photographed yet.

Furthermore, it is possible to check how many pictures are taken for each participant. However, these methods basically require time-consuming preparatory work for registering image data of all participants as reference images. In other words, these methods cannot be used when the user fails to accomplish the required preparation. There is another problem that the user takes a long time and cumbersome operations to search each participant's pictures when the user checks each participant's pictures.

Therefore, a need exists for an imaging apparatus (e.g., a camera) that allows a photographer to easily determine (without extensive preparation) whether a given object, such as a participant (person), has been photographed during a particular time frame, e.g., during a particular event. Furthermore, there is a need for the imaging apparatus to allow the photographer to easily determine how many times a given object, such as a participant, has been photographed during the particular time frame.

SUMMARY OF THE INVENTION

The present invention is directed to an imaging and/or displaying technique that can automatically detect an object from photographed image data and can display information related to the object based on a comparison between the photographed image data and memorized reference data, thus reducing the burden of a user.

One aspect of the present invention provides an imaging apparatus including an imaging element, a detecting circuit, a memorizing circuit, a comparing circuit, and a display device. The imaging element produces an imaging output. The detecting circuit detects an object based on image data produced from the imaging output of the imaging element and calculates a feature value representing a feature of the detected object. The memorizing circuit memorizes (stores) feature values of photographing objects. The comparing circuit compares the feature value obtained by the detecting circuit with the feature value of at least one photographing object previously memorized by the memorizing circuit. The display device displays an image based on the image data produced from the imaging output of the imaging element. The comparing circuit uses a feature value calculated by the detecting circuit based on the image data used to display the image on the display device in the comparison between the feature value obtained by the detecting circuit and the feature values previously memorized by the memorizing circuit. The display device displays information relating to a comparison result provided by the comparing circuit.

Another aspect of the present invention provides a method for controlling a display device including a detecting step of detecting an object based on image data produced from an imaging output of an imaging element and calculating a feature value representing a feature of the detected object, a comparing step of comparing the feature value obtained in the detecting step with a previously memorized feature value for at least one photographing object, and a displaying step of displaying an image on the display device based on the image data produced from the imaging output of the imaging element, wherein the comparing step uses a feature value calculated based on the image data used to display the image on the display device in the comparison between the feature value obtained in the detecting step and the previously memorized feature value for the at least one photographing object, and wherein the displaying step causes the display device to display information relating to a comparison result obtained in the comparing step.

Another aspect of the present invention provides a method for controlling an imaging apparatus including a producing step of producing image data by using an imaging element, a detecting step of detecting an object based on the image data produced in the producing step and calculating a feature value representing a feature of the detected object, a comparing step of comparing the feature value obtained in the detecting step with a previously memorized feature value for at least one photographing object, and a memorizing step of updating and memorizing photographing information relating to the photographing object when it is determined in the comparing step that the feature value obtained in the detecting step matches a previously memorized feature value for a photographing object.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11 and 12 are exemplary tables showing data stored in a fourth embodiment.

DETAILED DESCRIPTION OF THE EMBODIMENTS

Figure 1:
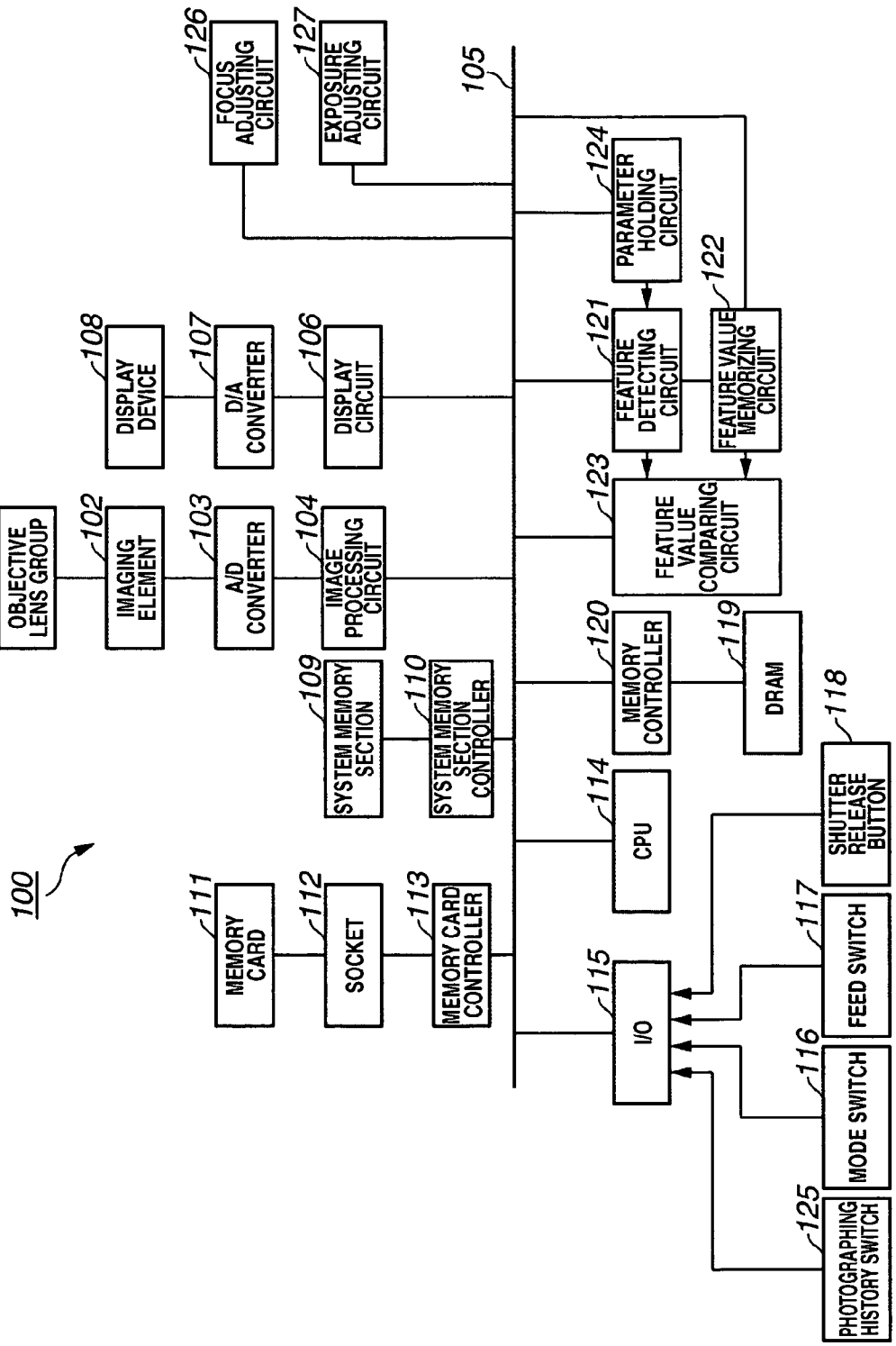
FIG. 1 is a block diagram showing an imaging apparatus in accordance with the present invention.

The following description of exemplary embodiments is merely illustrative in nature and is in no way intended to limit the invention, its application, or uses.

Exemplary embodiments can be incorporated into various imaging apparatuses (e.g., electronic cameras, camcorders, digital still cameras, film cameras, broadcast cameras, other imaging apparatuses as known by one of ordinary skill, and equivalents) forming imaging systems.

Processes, techniques, apparatuses, and materials as known by one of ordinary skill in the art may not be discussed in detail but are intended to be part of the enabling description where appropriate.

Additionally exemplary embodiments are not limited to visual imaging apparatuses (e.g., optical photographic systems), and, for example, the system can be designed for use with infrared and other wavelength imaging systems or any apparatus of device using flexible printed boards. Additionally, exemplary embodiments can be used with non-digital systems as well as digital systems (e.g., photographic systems using CCDs).

Similar reference numerals and letters refer to similar items in the following figures, and thus once an item is described with reference to one figure, it may not be discussed or further described with reference to other figures.

Exemplary embodiments of the invention will be described in detail below with reference to the drawings.

First Embodiment

FIG. 1 shows the arrangement of an imaging apparatus 100 in accordance with a first embodiment. In the present embodiment, the imaging apparatus 100 is an electronic still camera.

In FIG. 1, an objective lens group 101 is an assembly of lenses for forming an object image on an imaging element 102. The imaging element 102, such as a charge-coupled device (CCD), has a photoelectric conversion function and can convert the object image obtained through the objective lens group 101 into analog image data. An analog-digital (A/D) converter 103 receives the analog image data sent from the imaging element 102 and converts the analog image data into digital image data. An image processing circuit 104 can apply various imaging processing to the digital image data converted by the A/D converter 103 to produce display-oriented image data and recording-oriented image data.

A data bus 105 can transfer the image data. A display circuit 106 can process the display-oriented image data sent from the image processing circuit 104 to display an image on a display device 108. A digital-to-analog (D/A) converter 107 can convert the display-oriented image data into analog image data. The display device 108, constructed from a liquid crystal monitor, receives the analog image data from the D/A converter 107 and displays the converted display-oriented image data. A system memory section 109 is a flash memory or the like that can store programs for the imaging apparatus 100 and data required for the imaging processing.

A system memory section controller 110 can transfer data to the system memory section 109. A rewritable memory card 111 can record photographed image data. A memory socket 112 is detachably connected to the memory card 111. A memory card controller 113 can transfer the photographed image data via the memory socket 112 to the memory card 111. A central processing unit (CPU) 114 executes various programs for the imaging apparatus 100. For example, the CPU 114 controls photographing processing according to a program stored in the system memory section 109.

An Input/Output interface section (hereinafter, referred to as I/O interface section) 115 can control signals of various switches provided in the imaging apparatus 100. A mode switch 116 allows a user to instruct a desirable processing mode for the imaging apparatus 100. The imaging apparatus 100 includes a photographing mode allowing the user to take a picture, a playback mode allowing the user to review any one of photographed images on the display device 108, and a register mode allowing the user to memorize feature values of a photographing object that can be later used to identify each detection object.

A feed button 117, including a cross key, allows the user to input an instruction to the imaging apparatus 100. A shutter release button 118 allows the user to instruct photographing of a still image. When the user depresses the shutter release button 118 by a half stroke (hereinafter, referred to as "half depression"), a switch SW1 (not shown) is turned on. When the user depresses the shutter release button 118 by a full stroke (hereinafter, referred to as "full depression"), a switch SW2 (not shown) is turned on. A dynamic random-access memory (DRAM) 119 can hold the display-oriented image data transmitted from the image processing circuit 104 via the data bus 105 to the display circuit 106, to display an image on the display device 108. A memory controller 120 connects the DRAM 119 to the data bus 105.

A feature detecting circuit 121 can detect a characteristic portion of a detected object (i.e., a detection object), e.g., a human face, based on the display-oriented image data transmitted via the data bus 105 and a parameter read from a parameter holding circuit 124. The feature detecting circuit 121 calculates a feature value from the detected characteristic portion. The CPU 114 transfers the feature value to a feature value memorizing circuit 122. The feature value memorizing circuit 122 memorizes the feature value.

Alternatively, the CPU 114 can control the memory card 111 or the system memory section 109 to store feature values produced through past photographing. In this case, the CPU 114 can read the feature value via the data bus 105 from the memory card 111 or the system memory section 109 and can control the feature value memorizing circuit 122 to memorize the readout feature value.

A feature value comparing circuit 123 compares the feature value obtained from the feature detecting circuit 121 with the feature value read from the feature value memorizing circuit 122. The feature value comparing circuit 123 calculates the similarity between the compared feature values. When the compared feature values are similar with each other, the feature value comparing circuit 123 determines that a detected object corresponding to the feature value detected by the feature detecting circuit 121 is identical with a memorized photographing object corresponding to the feature value memorized in the feature value memorizing circuit 122.

Conventional techniques, including a neural network and other learning-based techniques, can be used to detect a face image from photographed image data. Furthermore, template matching methods can be used to discriminate a physical shape, such as eyes, nose, mouth, or contour of face, from photographed image data. Furthermore, statistical analyses can be used to detect feature values representing the flesh color or eye shape from photographed image data (refer to, for example, Japanese Patent Application Laid-open No. 10-232934 or Japanese Patent Application Laid-open No. 2000-48184).

Furthermore, there is a conventional method for determining whether or not a detected position is adjacent to a previously detected face region, or detecting a color in the vicinity of the face region considering the color of an article of clothing. Furthermore, there is a conventional method for discriminating a face by lowering a threshold of the central region on a screen. Moreover, there is a conventional method for tracking a main object based on a correlation value obtained by setting a region where the main object is present and memorizing the histogram or color information.

In the present embodiment, a face region can be identified by detecting a pair of eyes (both eyes), nose, mouth, and contour of the face and determining their relative relationship.

Besides human faces, the feature detecting circuit 121 can detect other objects (e.g., animals, sports player's numbers, and special cars) based on data read from the parameter holding circuit 124.

For example, Japanese Patent Application Laid-open No. 5-89244 proposes a method for recognizing characters and/or numerals on a number plate when an image of a car is obtained by a camera. For example, it is possible to memorize a sports player number as a feature value beforehand. Then, it is possible to search a portion matching with the memorized feature when a still image is newly obtained.

Furthermore, Japanese Patent Application Laid-open No. 07-231733 proposes a method for recognizing the type of a fish based on a length and a height obtained from image data of the fish. This technique can be also applied to detect an animal. In this manner, the feature detecting circuit 121 can identify any arbitrary photographing object based on the data read from the parameter holding circuit 124.

A photographing history switch 125 can be operated by a user to set a history period. In the present embodiment, the history period is equal to a period of time during which the user continuously presses the photographing history switch 125. Unless the user depresses the photographing history switch 125, the feature value comparing circuit 123 performs the comparison for all of the feature values produced from the feature detecting circuit 121 and the feature values read from the feature value memorizing circuit 122.

On the other hand, during the history period, the feature value comparing circuit 123 compares the feature value produced from the feature detecting circuit 121 with a feature value newly memorized in the feature value memorizing circuit 122 during the history period. In other words, when the photographing history switch 125 is in an ON state, the feature value comparing circuit 123 does not use the feature value memorized in the feature value memorizing circuit 122.

A focus adjusting circuit 126 drives a focusing lens in the objective lens group 101 to adjust an in-focus condition of an object image formed on the imaging element 102. An exposure adjusting circuit 127 controls the objective lens group 101 and/or an iris or a shutter disposed adjacent to the objective lens group 101 to adjust a light quantity reaching the imaging element 102.

Before the shutter release button 118 is fully depressed to turn on the switch SW2, the imaging apparatus 100 constantly updates the display-oriented image data based on a periodic output of the imaging element 102, and continuously performs monitoring processing for displaying a moving or time-varying image of a detected object on the display device 108. During the monitoring processing, the moving image of the object is continuously displayed. Therefore, the user can find a photographing opportunity while monitoring the image of the object displayed on the display device 108.

Furthermore, in parallel with the monitoring processing, the feature detecting circuit 121 continuously performs the feature detecting processing. The feature detecting processing of the present embodiment includes face detection processing (i.e., processing for detecting a human face). To this end, the parameter holding circuit 124 can store, beforehand, a value representing the feature of a human face. When a human face is detected by the feature detecting circuit 121, the display device 108 superimposes a face frame on the detected human face.

The imaging apparatus 100 can adjust the focus of the camera on the detected face position, even if the object shifts or causes an angular change. Furthermore, to adjust the exposure, the imaging apparatus 100 can give a largest weighting value for the detected face position. Thus, even if the object shifts or causes an angular change, the imaging apparatus 100 can obtain image data of a human face having an optimized brightness.

Furthermore, in response to a user's instruction of a photographing timing entered through the shutter release button 118, a photographed image can be displayed on the display device 108 immediately after finishing the photographing operation. With this processing, the user can immediately confirm success or failure in the photographing operation.

Next, the photographing processing of the imaging apparatus 100 will be explained with reference to the flowchart shown in FIG. 2. When a user sets a photographing mode through the mode switch 116, the CPU 114 starts its operation according to the flowchart shown in FIG. 2.

In step S101, the CPU 114 confirms the condition of the photographing history switch 125. When the photographing history switch 125 is in an ON state, it means that the operation is in the history period.

In step S102, the CPU 114 produces display-oriented image data based on an output of the imaging element 102 and starts the monitoring processing for displaying a moving or time-varying image of a detected object on the display device 108.

In step S103, the imaging element 102 performs photoelectric conversion to output analog image data. The image processing circuit 104 produces digital display-oriented image data based on the analog image data obtained from the imaging element 102. The DRAM 119 stores the digital display-oriented image data. The display device 108 displays an image of the monitored object based on the display-oriented image data.

In step S104, the feature detecting circuit 121 reads the display-oriented image data stored in the DRAM 119 and performs the face detection processing using a parameter read from the parameter holding circuit 124 to calculate a feature value. When the image data includes plural face images, a feature value is calculated for each face image. The face detection processing can be performed based on original digital image data of the display-oriented image data or based on detection-oriented image data separately produced from the digital image data.

In step S105, the CPU 114 determines whether it has succeeded in the face detection processing of step S104. When the CPU 114 has succeeded in the face detection processing (i.e., YES in step S105), the processing routine proceeds to step S106. When the CPU 114 has failed in the face detection processing (i.e., NO in step S105), the processing routine proceeds to step S115.

In step S106 (i.e., when having succeeded in the face detection processing), the CPU 114 determines whether the photographing history switch 125 is in an ON state. When the photographing history switch 125 is in an ON state (i.e., YES in step S106), the processing routine proceeds to step S107 to read feature values accompanied with history flags from the feature value memorizing circuit 122 as feature values memorized during the history period. In this case, the feature value accompanied with a history flag is a feature value to which a later-described history flag is allocated, as described later.

When the photographing history switch 125 is not turned on (i.e., NO in step S106), the processing routine proceeds to step S108 to read all of the feature values from the feature value memorizing circuit 122, including the feature values read from the memory card 111 or from the system memory section 109.

Then, in step S109, the feature value comparing circuit 123 compares the feature value obtained in step S104 with the feature values read in step S107 or in step S108. When the compared feature values have a similarity exceeding a predetermined reference level, it is concluded that the detected object displayed on the display device 108 is identical with any one of memorized photographing objects.

When the compared objects are judged as identical with each other (i.e., YES in step S109), the processing routine proceeds to step S110. Otherwise, the processing routine proceeds to step S111.

In step S110, the CPU 114 reads a cumulative number representing photographing operations having been performed (hereinafter, referred to as "cumulative photographing number") from the feature value memorizing circuit 122.

To this end, the feature value memorizing circuit 122 memorizes a cumulative photographing number for each photographing object as matching information resulting from the comparison of the objects based on the feature values. The system memory section 109 stores the cumulative photographing number.

In other words, the cumulative photographing number of each photographing object is a numerical value representing how many times the camera has taken the image of this photographing object. The feature value memorizing circuit 122 can separately memorize (store) a cumulative photographing number with respect to photographing operations performed during the history period, in addition to the total cumulative number corresponding to all photographing operations having been performed regardless of the history period.

In step S111, the CPU 114 controls the system memory section 109 to memorize (store) coordinate data of the face image(s) detected in step S104.

In step S112, the CPU 114 determines whether the feature value comparing circuit 123 has finished the comparison of the feature values with respect to all of the face images detected in step S104. When the comparison of the feature values is completely finished (i.e., YES in step S112), the processing routine proceeds to step S113. When the comparison of the feature values is not finished yet (i.e., NO in step S112), the processing routine returns to step S106 to repeat the above-described comparison of feature values for the remaining face image(s).

In step S113, the CPU 114 controls the display device 108 to display a face detection frame that is superimposed on each detected face image with reference to the coordinate data stored in the system memory section 109. The face detection frame has a size and a shape corresponding to each face image.

In step S114, the CPU 114 controls the display device 108 to display a cumulative photographing number, for each detected face image, at a position adjacent to the face detection frame. Thus, a numerical image of the cumulative number can be superimposed on the object image memorized (stored) in the system memory section 109. When the history period is set by a user, the CPU 114 controls the display device 108 to display a cumulative photographing number corresponding to photographing operations performed during the history period. Otherwise, the CPU 114 controls the display device 108 to display a cumulative number corresponding to all photographing operations that have been performed.

Figure 4:
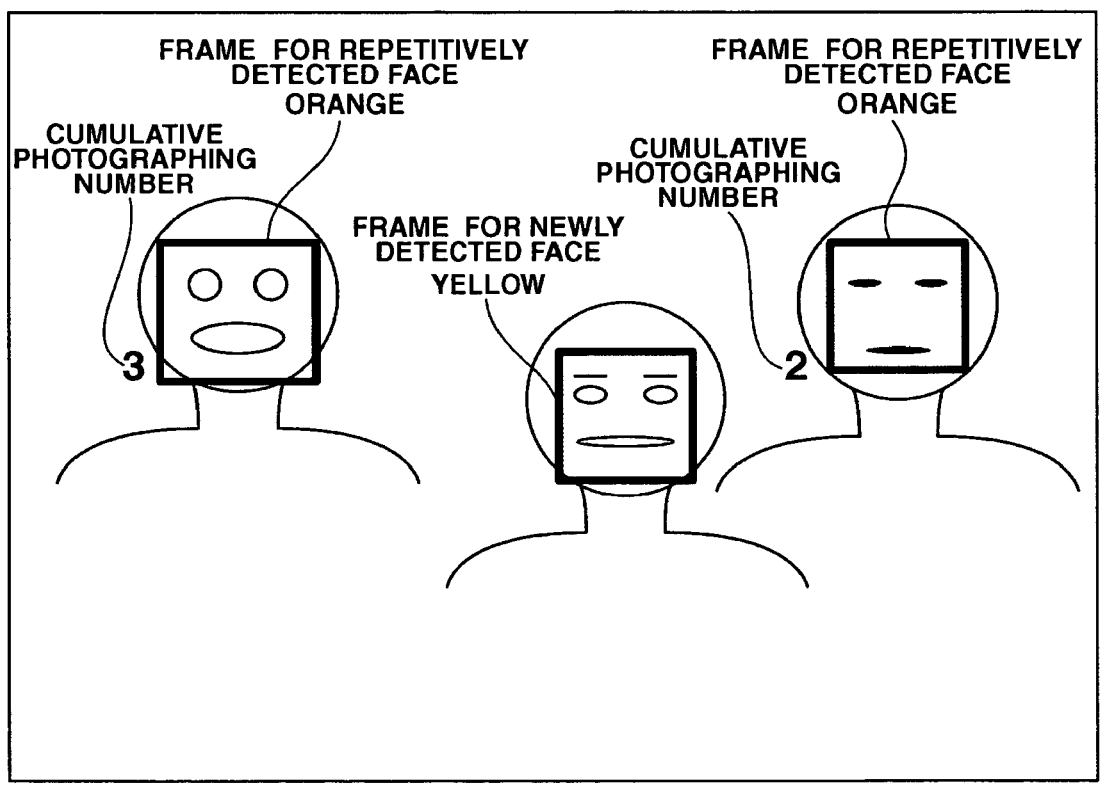
FIG. 4 shows an example of an image displayed on a display device in accordance with the first embodiment.

FIG. 4 shows an example of an image displayed on the display device 108, according to which a rectangular face detection frame surrounding each detected face image is displayed and a cumulative photographing number for each detected face is displayed in the vicinity of the detected face image. The face detection frame is not limited to a rectangular shape, and accordingly may be elliptical or any other shape corresponding to the contour of a detected face image. In the present embodiment, when a face image of a certain person is first obtained, only the face detection frame is displayed without displaying any cumulative photographing number.

Furthermore, the face detection frame surrounding a newly detected face is differentiated, in the frame color, from the face detection frame surrounding a repetitively detected face, so that a user can easily recognize the type of each face detection frame. For example, in the present embodiment, the face detection frame surrounding a newly detected face is yellow and the face detection frame surrounding a repetitively detected face is orange. It is further possible to generate a sound message when a newly detected face is displayed.

Referring again to FIG. 2, in step S115, if succeeded in the face detection processing of step S104, the CPU 114 controls the focus adjusting circuit 126 and the exposure adjusting circuit 127 to perform focus adjustment processing (referred to as AF in FIG. 2) and exposure adjustment processing (referred to as AE in FIG. 2) with reference to the detected face position(s). When the CPU 114 has failed in the face detection processing of the step S104, the focus adjustment processing and the exposure adjustment processing can be performed using a conventional method, such as a center-weighted method that gives a large weighting value to a central area compared with a peripheral area.

In step S116, the CPU 114 determines whether the shutter release button 118 is half depressed to turn on the switch SW1. When the switch SW1 is in an ON state (i.e., YES in step S116), the processing routine proceeds to step S117. Otherwise, the processing routine returns to step S103.

When the switch SW1 is tuned on, the CPU 114 controls the camera to fix both the focus and the exposure and hold the conditions until the user fully depresses the shutter release button 118 to turn on the switch SW2.

In step S117, the CPU 114 updates the display-oriented image data based on an output of the imaging element 102 and updates an object image displayed on the display device 108.

In step S118, the CPU 114 determines whether the shutter release button 118 is fully depressed to turn on the switch SW2. When the switch SW2 is in an ON state (i.e., YES in step S118), the processing routine proceeds to step S121 of FIG. 3. When the switch SW2 is not turned on (i.e., NO in step S118), the processing routine returns to step S116. If the switch SW1 is held in an ON state while the switch SW2 is not turned on, the CPU 114 repeats the processing of steps S116 and S117. Thus, the CPU 114 continuously updates the image displayed on the display device 108 without performing the face detection and the focus adjustment.

As described above, the present embodiment can provide the monitoring processing that enables a user to easily obtain information about how many times the user has taken a picture of each object when the object image is displayed on the display device 108. Accordingly, when a user (as a photographer) joins an indoor or outdoor event, such as a dinner party or a day camp, the user can easily check a cumulative photographing number for each participant every time this participant is displayed on the display device 108 of the imaging apparatus 100, even if the user has no acquaintance with respective participants.

Figure 3:
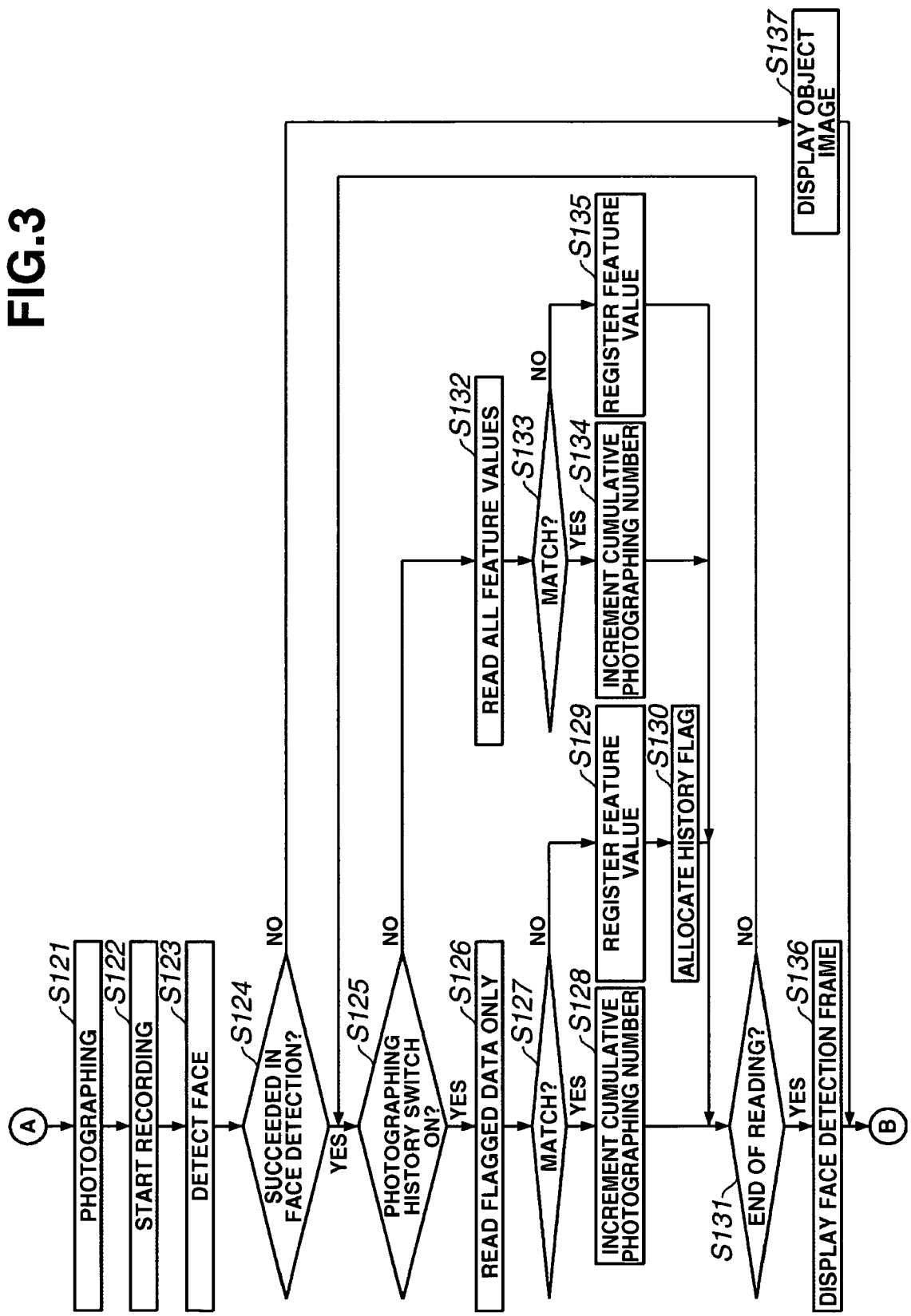
FIG. 3 is a flowchart showing the imaging processing in accordance with the first embodiment.

Returning to the flowchart, when the switch SW2 is in an ON state in step S118, the processing routine proceeds to step S121 of FIG. 3 in which the CPU 114 performs the photographing processing. The A/D converter 103 converts the analog image data produced from the imaging element 102 into digital image data. The image processing circuit 104 corrects the brightness and adjusts a white balance. Then, the image data is recorded in the memory. Furthermore, the image data is compressed into display-oriented image data and stored in a designated region of the DRAM 119. The image processing circuit 104 compresses the image data and produces the recording-oriented image data.

In step S122, the CPU 114 controls the memory card controller 113 to transfer the recording-oriented image data to the memory card 111.

In step S123, the feature detecting circuit 121 reads the display-oriented image data from the DRAM 119 and performs the face detection processing based on the image data using a parameter read from the parameter holding circuit 124. As a result, the feature detecting circuit 121 calculates a feature value.

In step S124, the CPU 114 determines whether it has succeeded in the face detection processing of step S123. When the CPU 114 has succeeded in the face detection processing (i.e., YES in step S124), the processing routine proceeds to step S125. When the CPU 114 has failed in the face detection processing (i.e., NO in step S124), the processing routine proceeds to step S137. In step S137, the CPU 114 controls the display device 108 to display an image based on the display-oriented image data stored in the DRAM 119. Then, the processing routine returns to step S103 of FIG. 2.

In step S125, the CPU 114 determines whether the photographing history switch 125 is in an ON state. When the photographing history switch 125 is in an ON state (i.e., YES in step S125), the processing routine proceeds to step S126 to read a feature value (i.e., a feature value accompanied with a later-described history flag) that has been memorized (stored) during the history period in the feature value memorizing circuit 122.

In step S127, the feature value accompanied with a history flag is compared with the feature value obtained in step S124. When the compared feature values have a similarity exceeding a predetermined reference level, it is concluded that the detected object displayed on the display device 108 is identical with any one of memorized photographing objects. When the compared objects are judged as identical with each other (i.e., YES in step S127), the processing routine proceeds to step S128. Otherwise, the processing routine proceeds to step S129.

In step S128, the CPU 114 increments, by 1, the cumulative photographing number accompanying the feature value. Then, the processing routine proceeds to step S131. An initial value of the cumulative photographing number is 0. The cumulative photographing number increases by 1 every time the processing routine passes step S128.

In step S129, the feature value memorizing circuit 122 memorizes (registers) the feature value calculated in step S124 as a feature value of a newly detected photographing object. Namely, the processing routine passing step S129 increases the total number of photographing objects corresponding to the feature values memorized in the feature value memorizing circuit 122.

In step S130, the CPU 114 allocates a history flag to the feature value memorized in the step S129. Then, the processing routine proceeds to step S131.

In step S131, the CPU 114 determines whether the feature value comparing circuit 123 has finished the comparison of the feature values for all of the face images detected in step S124. When the comparison has already finished (i.e., YES in S131), the processing routine proceeds to step S136. Otherwise, the processing routine returns to step S125 to repeat the comparison of feature values for the remaining face image(s).

In step S136, the CPU 114 controls the display device 108 to display (superimpose) a face detection frame having the size corresponding to the face image on an object image of each detected face with reference to the coordinate data memorized in the system memory section 109. Then, the processing routine returns to step S103 of FIG. 2.

In this manner, under the condition that the photographing history switch is in an ON state, if the feature value of a face image detected from the photographed image data is similar to the feature value memorized in the feature value memorizing circuit 122, the CPU 114 increments the cumulative photographing number of a photographing object in step S128. During the monitoring processing, the CPU 114 controls the display device 108 to superimpose the cumulative photographing number in the vicinity of the object image in step S114.

Thus, the user can easily know the cumulative photographing number of each photographing object. Furthermore, the feature value memorizing circuit 122 not only increments the cumulative photographing number but also additionally memorizes the obtained feature value. When the information about the feature values of each photographing object is increased, the accuracy in the matching judgment can be increased.

Furthermore, when the feature value of the face image detected from the photographed image data is not similar to the feature value memorized in the feature value memorizing circuit 122, the feature value memorizing circuit 122 memorizes (registers) the feature value as a feature value corresponding to a newly detected object in step S129. In step S130, the CPU 114 allocates a history flag to the feature value. Thus, it becomes possible to discriminate, based on the history flag, the feature value of any object newly detected during the history period.

Returning to step S125 of FIG. 3, when the photographing history switch 125 is not in an ON state (i.e., NO in step S125), the processing routine proceeds to step S132.

In step S132, the feature value comparing circuit 123 reads all of the feature values from the feature value memorizing circuit 122, including the feature values read from the memory card 111 or the system memory section 109.

In step S133, the feature values read from the feature value memorizing circuit 122 are compared with the feature values obtained in step S124. When the compared feature values have a similarity exceeding a predetermined reference level, it is concluded that the detected object displayed on the display device 108 is identical with any one of memorized photographing objects. When the compared objects are judged as identical with each other (i.e., YES in step S133), the processing routine proceeds to step S134. Otherwise, the processing routine proceeds to step S135.

In step S134, the CPU 114 increments, by 1, the cumulative photographing number accompanying the feature value. Then, the processing routine proceeds to step S131. An initial value of the cumulative photographing number is 0. The cumulative photographing number increases by 1 every time the processing routine passes step S134.

In step S135, the feature value memorizing circuit 122 memorizes (registers) the feature value calculated in step S124 as a feature value of a newly detected object. Then, the processing routine proceeds to step S131. Namely, the processing routine passing step S135 increases the total number of photographing objects corresponding to the feature values memorized in the feature value memorizing circuit 122 every time the processing routine passes step S135.

When the photographing history switch is not in an ON state, no history flag is provided even when the feature value of a newly detected object is displayed. In this manner, turning on the photographing history switch 125 differentiates the processing in such a manner that no history flag is provided for the feature value when the feature value corresponding to a new object is detected.

The imaging apparatus 100 equipped with the photographing history switch 125 capable of setting the history period includes the effects described below.

For example, when a user is a professional photographer, his/her photographing objects will be different every time. In such a case, it is not necessary to set the history period, because the only necessary thing to do is to check whether or not the user has ever taken a picture of the object.

However, it will be inconvenient if the present photographing object is identical with an object photographed previously. For example, Mr. AAA joined a dinner party and was photographed at least once by a camera of a user. Mr. AAA also attended another event taken placed previously and was photographed by the same camera. In such a case, the feature value memorizing circuit 122 already stores the feature value corresponding to Mr. AAA, before Mr. AAA attends the dinner party. Thus, even if Mr. AAA is not photographed yet in the dinner party, the user may miss a chance to take a picture of Mr. AAA because a cumulative photographing number for Mr. AAA displayed on a monitoring screen is 1 or more.

Accordingly, in the present embodiment, when the photographing history switch 125 is turned on to set the history period, the cumulative photographing number for each object can be incremented only during the history period. Furthermore, to discriminate the processing, a history flag can be set for the feature value corresponding to a face image newly detected during the history period. When the photographing history switch 125 is turned off to terminate the history period, the setting of the history flag is also cancelled.

Returning to the above-described situation, the user can turn on the photographing history switch 125 during the previous event. The cumulative photographing number of Mr. AAA, effective only during the history period, is displayed in the vicinity of his image on the monitoring screen during the monitoring processing.

When the event is over, the user can turn off the photographing history switch 125. At this moment, all of history flags allocated for respective feature values are cancelled. In other words, the cumulative photographing number of Mr. AAA can be initialized to 0 at this moment. Then, the cumulative photographing number of Mr. AAA starts incrementing again when the user turns on the photographing history switch 125 in the beginning of the dinner party.

Thus, the cumulative photographing number of Mr. AAA displayed on the monitoring screen during the dinner party correctly shows a total number of pictures taken during the dinner party.

In this manner, according to the present embodiment, the user can easily check whether or not each object is already photographed and also can accurately know how many pictures the user has ever taken for each object during a pre-designated period, without referring to the information about previously photographed image data.

Although the present embodiment uses the photographing history switch 125 to determine the history period, the method for setting the history period is not limited to a particular method and accordingly can be modified in various ways. For example, the user can designate start/end time of the history period. The imaging apparatus can automatically set the history period according to a designated date/time. Furthermore, the history period can be automatically set when the photographing mode is changed into a full-automatic or portrait mode.

Furthermore, the feature value of each photographing object can be stored in the system memory section 109 of the imaging apparatus 100 or in the memory card 111. In either case, the memorized feature value can be transferred to the feature memorizing circuit 122. To store the feature values as much as possible, the storage medium can be adequately selected considering the type of detection object.

Furthermore, the residual capacity of the memory card 111 may decrease to zero during a photographing operation. In such a case, instead of immediately exchanging the memory card 111 for a new one, the feature values stored in the memory card 111 can be temporarily transferred to the system memory section 109. Furthermore, each photographed image data can be correlated with the feature value, so that particular feature values can be automatically erased when the image data of a relevant photographing object is erased.

Second Embodiment

Next, another photographing processing of the imaging apparatus 100 will be described with reference to the flowchart shown in FIG. 5. The flowchart shown in FIG. 5 is different from the flowchart shown in FIG. 2 in that the face detection is not constantly performed during the monitoring processing and is performed only when there is any change in the detected object.

Figure 2:
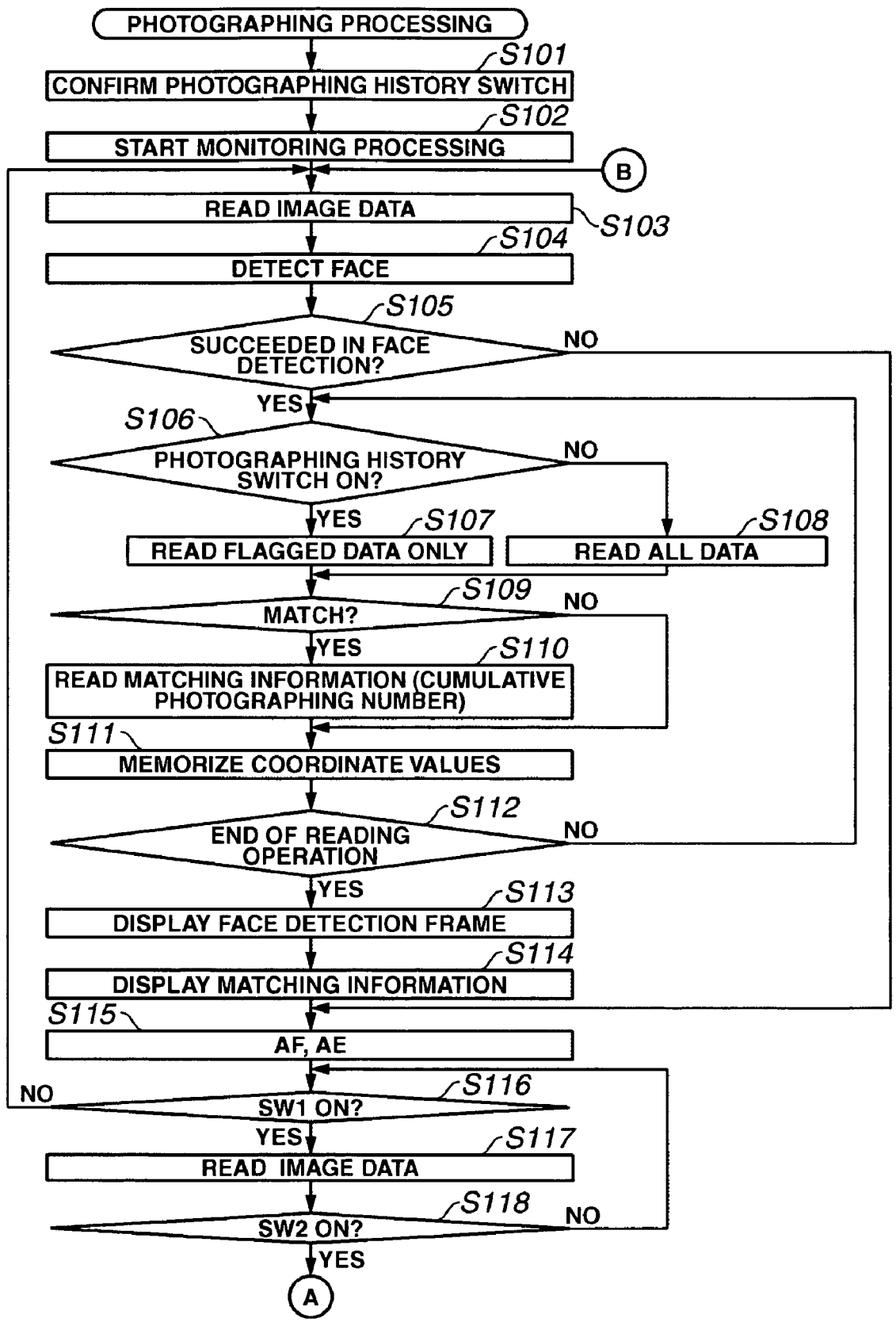
FIG. 2 is a flowchart showing imaging processing in accordance with a first embodiment.
Figure 5:
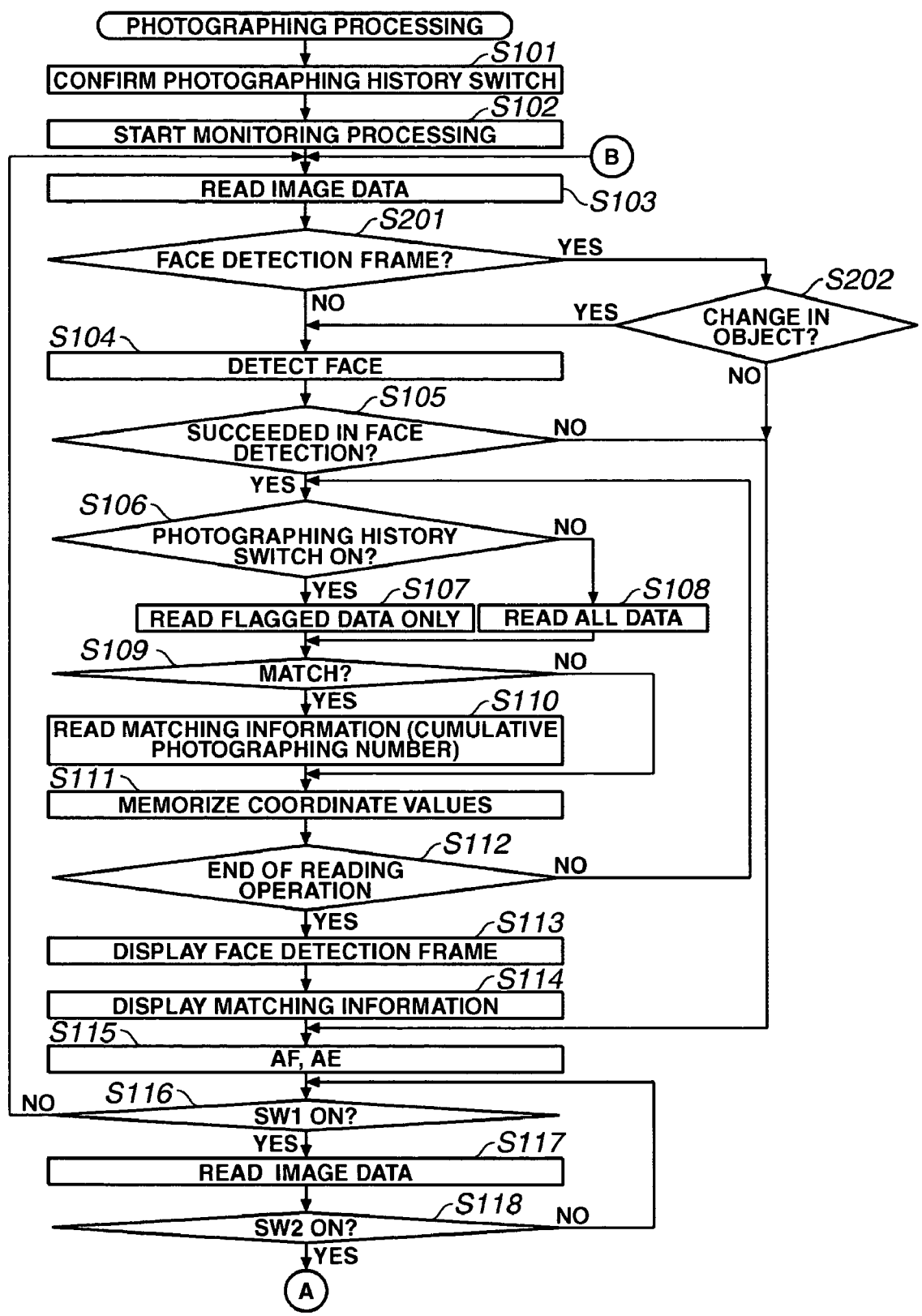
FIG. 5 is a flowchart showing imaging processing in accordance with a second embodiment.

In FIG. 5, the steps identical with those shown in FIG. 2 are denoted by the same reference numerals.

When a user sets a photographing mode, the CPU 114 confirms the condition of the photographing history switch 125 in step S101.

In step S102, the CPU 114 produces display-oriented image data based on an output of the imaging element 102 and starts the monitoring processing for controlling the display device 108 to display a moving or time-varying image of the detected object.

In step S103, the imaging element 102 performs the photoelectric conversion to output analog image data. The image processing circuit 104 produces display-oriented image data based on digital image data obtained from the analog image data. The DRAM 119 memorizes the display-oriented image data. Then, the display device 108 displays an object image based on the display-oriented image data.

Next, in step S201, the CPU 114 determines whether a face detection frame is displayed on the display device 108. When no face detection frame is displayed (i.e., NO in step S201), the processing routine proceeds to step S104 to execute the face detection processing. When any face detection frame is displayed on the display device 108 (i.e., YES in step S201), the processing routine proceeds to step S202 to determine whether the face detection processing needs to be performed.

In step S202, the image data obtained in step S103 is compared with the brightness of the image data subjected to the latest face detection processing. When the difference exceeds a reference level (i.e., YES in step S202), it is concluded that any change has occurred in the detected object. Thus, the processing routine proceeds to step S104. When no change has occurred in the detected object (i.e., NO in step S202), it is concluded no new face detection processing is necessary. Thus, the processing routine proceeds to step S115 without performing the face detection processing.

Any other method can be used in step S202 to detect a change occurring in the detected object. For example, it is possible to use the information relating to the driving condition of a zoom lens provided in the objective lens group 101, the information relating to the position of the imaging apparatus 100, or an output of an angular velocity sensor (not shown) installed in the imaging apparatus 100.

The processing succeeding step S104 is identical with the processing of the flowchart shown in FIG. 2. As described above, according to the present embodiment, the new face detection processing is performed only when any change has occurred in the detected object while a face detection frame is displayed on the display device 108. Accordingly, the processing burden of the feature detecting circuit 121 or the feature value comparing circuit 123 can be reduced. Furthermore, the consumption energy of the imaging apparatus 100 can be reduced.

Third Embodiment

Next, another photographing processing of the imaging apparatus 100 will be described with reference to the flowchart shown in FIG. 6. The third embodiment (i.e., the flowchart shown in FIG. 6) is different from the first or second embodiment in that the face detection result gives no effects on the focus adjustment processing and the exposure adjustment processing.

Figure 6:
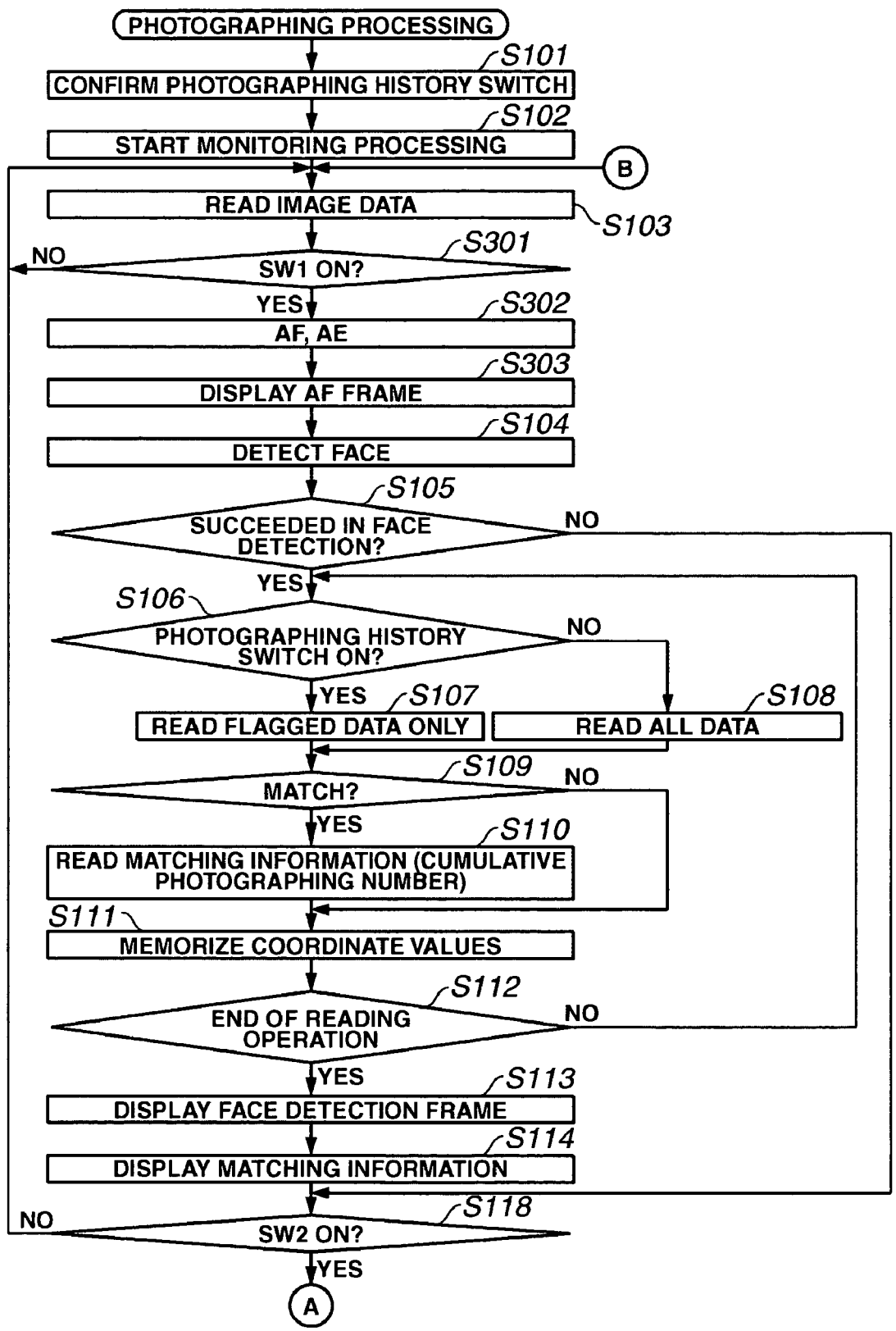
FIG. 6 is a flowchart showing imaging processing in accordance with a third embodiment.

When a photographing mode is set by a user through the mode switch 116, the CPU 114 starts the operation according to the flowchart shown in FIG. 6.

In step S101, the CPU 114 confirms the condition of the photographing history switch 125. When the photographing history switch 125 is in an ON state, it means that the operation is in the history period.

In step S102, the CPU 114 produces display-oriented image data based on an output of the imaging element 102 and starts the monitoring processing for displaying a moving or time-varying image of a detected object on the display device 108.

In step S103, the imaging element 102 performs photoelectric conversion to output analog image data. The image processing circuit 104 produces digital display-oriented image data based on the analog image data obtained from the imaging element 102. The DRAM 119 stores the digital display-oriented image data. The display device 108 displays an image of the detected object based on the display-oriented image data. Then, the processing routine proceeds to step S301.

In step S301, the CPU 114 determines whether the shutter release button 118 is half depressed to turn on the switch SW1. When the switch SW1 is in an ON state (i.e., YES in step S301), the processing routine proceeds to step S302. Otherwise, the processing routine returns to step S103.

In step S302, the CPU 114 controls the focus adjusting circuit 126 and the exposure adjusting circuit 127 to perform the focus adjustment processing and the exposure adjustment processing based on the display-oriented image data.

In step S303, the CPU 114 controls the display device 108 to display (superimpose) a frame indicating the area of a focus adjustment object (hereinafter, referred to as "AF frame") on an object image.

In step S104, the feature detecting circuit 121 reads the display-oriented image data stored in the DRAM 119 and performs the face detection processing using a parameter read from the parameter holding circuit 124 to calculate a feature value. When the image data include plural face images, a feature value is calculated for each face image.

In step S105, the CPU 114 determines whether it has succeeded in the face detection processing of step S104. When the CPU 114 has succeeded in the face detection processing (i.e., YES in step S105), the processing routine proceeds to step S106. When the CPU 114 has failed in the face detection processing (i.e., NO in step S105), the processing routine skips steps S106 through S114 and proceeds to step S118.

In step S106 (i.e., when succeeded in the face detection processing), the CPU 114 determines whether the photographing history switch 125 is in an ON state. When the photographing history switch 125 is in an ON state (i.e., YES in step S106), the processing routine proceeds to step S107 to read a feature value accompanied with a history flag from the feature value memorizing circuit 122 as a feature value memorized during the history period.

When the photographing history switch 125 is not turned on (i.e., NO in step S106), the processing routine proceeds to step S108 to read all of the feature values from the feature value memorizing circuit 122, including the feature values read from the memory card 111 or the system memory section 109.

Then, in step S109, the feature value comparing circuit 123 compares with the feature value obtained in step S104 with the feature value read in step S107 or in step S108. When the compared feature values have a similarity exceeding a predetermined reference level, it is concluded that the detected object displayed on the display device 108 is identical with any one of memorized photographing objects. When the compared objects are judged as identical with each other (i.e., YES in step S109), the processing routine proceeds to step S110. Otherwise, the processing routine proceeds to step S111.

In step S110, the CPU 114 reads a cumulative photographing number from the feature value memorizing circuit 122 and controls the system memory section 109 to store the readout cumulative photographing number. To this end, the feature value memorizing circuit 122 memorizes a cumulative photographing number for each photographing object as matching information resulting from the comparison of the objects based on the feature values.

The cumulative photographing number of each photographing object is numerical information representing how many times the camera has taken the image of each photographing object. The feature value memorizing circuit 122 can separately memorize a cumulative photographing number with respect to photographing operations performed during the history period, in addition to the total cumulative number corresponding to all photographing operations having been performed regardless of the history period.

In step S111, the CPU 114 controls the system memory section 109 to memorize coordinate data of the face image(s) detected in the step S104.

In step S112, the CPU 114 determines whether the feature value comparing circuit 123 has finished the comparison of the feature values with respect to all of the face images detected in the step S104. When the comparison of the feature values is completely finished (i.e., YES in step S112), the processing routine proceeds to step S113. When the comparison of the feature values is not finished yet (i.e., NO in step S112), the processing routine returns to step S106 to repeat the above-described comparison of feature values for the remaining face image(s).

In step S113, the CPU 114 controls the display device 108 to display a face detection frame that is superimposed on each detected face image with reference to the coordinate data stored in the system memory section 109. The face detection frame has a size and a shape corresponding to each face image.

In step S114, the CPU 114 controls the display device 108 to display a cumulative photographing number, for each detected face image, at a position adjacent to the face detection frame. Thus, a numerical image of the cumulative number can be superimposed on the object image memorized in the system memory section 109.

Figure 7:
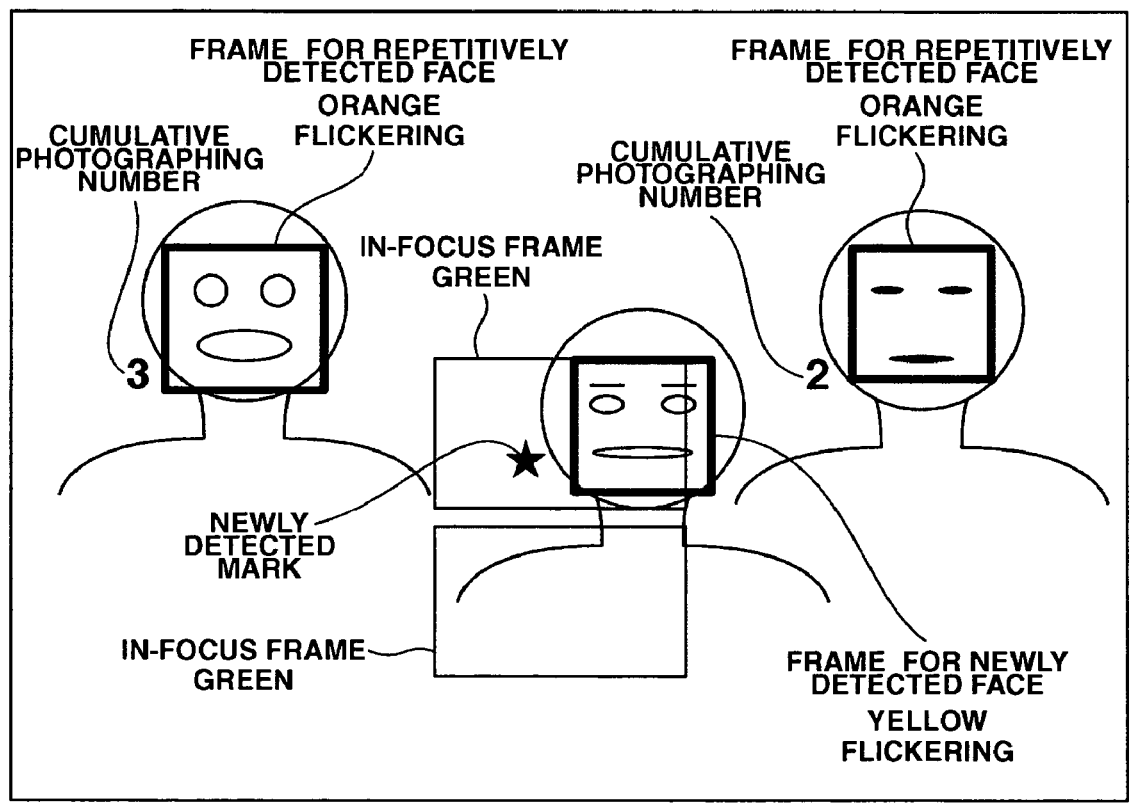
FIG. 7 shows an example of an image displayed on the display device in accordance with the third embodiment.

FIG. 7 shows an example of an image displayed on the display device 108, according to which a rectangular face detection frame surrounding each detected face image is displayed and a cumulative photographing number for each detected face is displayed in the vicinity of the detected face image.

When both the AF frame and the face detection frame are simultaneously displayed, a user may not be able to discriminate the type of each frame. Hence, in the present embodiment, only the face detection frame flickers for a predetermined time (e.g., at the intervals of 0.5 second).

Furthermore, the AF frame, the face detection frame surrounding a newly detected face, and the face detection frame surrounding a repetitively detected face are differentiated in their colors, so that a user can easily recognize the type of each frame. For example, in the present embodiment, the AF frame is green, the face detection frame surrounding a newly detected face is yellow, and the face detection frame surrounding a repetitively detected face is orange.

Furthermore, according to the display example of FIG. 7, a star mark is displayed in the vicinity of the face detection frame surrounding a newly detected face, to let the user easily know the newly detected face.

Referring again to the flowchart in FIG. 6, in step S114, the CPU 114 controls the display device 108 to perform display processing. In step S118, the CPU 114 determines whether the switch SW2 is in an ON state. The succeeding processing is identical with that of the first embodiment.

In the present embodiment, the AF frame and the face detection frame are differently displayed and accordingly a user can clearly know a newly detected face as well as a cumulatively detected face in an in-focus state.

In the above-described embodiments, the feature value of each photographing object is memorized (stored) in the feature value memorizing circuit 122 during the photographing processing. However, another method can be used to memorize the feature value in the feature value memorizing circuit 122.

Figure 8:
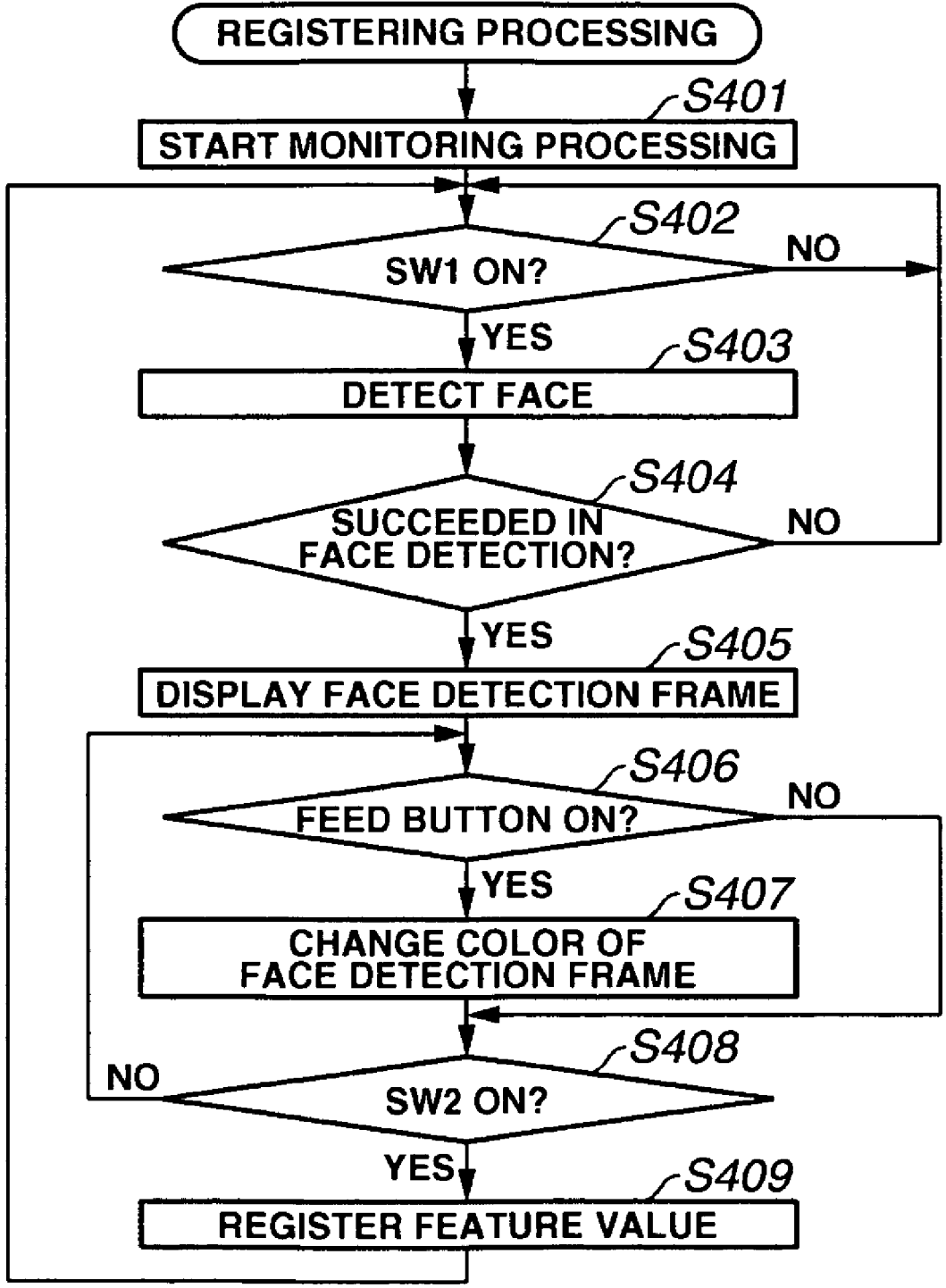
FIG. 8 is a flowchart showing feature value registering processing.

FIG. 8 shows a flowchart of another exemplary process for memorizing the feature value in the feature value memorizing circuit 122.

When the user selects a register mode through the mode switch 116, the CPU 114 starts the registering processing according to the flowchart shown in FIG. 8.

In step S401, the CPU 114 produces display-oriented image data based on an output of the imaging element 102 and controls the display device 108 to start the monitoring processing for displaying a moving or time-varying image of a detected object.

In step S402, the CPU 114 determines whether the shutter release button 118 is half depressed to turn on the switch SW1. When the switch SW1 is in an ON state (i.e., YES in step S402), the processing routine proceeds to step S403. When the switch SW1 is not in an ON state (i.e., NO in step S402), the processing routine repeats the processing of step S402.

In step S403, the feature detecting circuit 121 reads the display-oriented image data stored in the DRAM 119 and performs the face detection processing using a parameter read from the parameter holding circuit 124 to calculate a feature value. When the image data includes plural face images, a feature value is calculated for each face image.

In step S404, the CPU 114 determines whether it has succeeded in the face detection processing of step S403. When the CPU 114 has succeeded in the face detection processing (i.e., YES in step S404), the processing routine proceeds to step S405. When the CPU 114 has failed in the face detection processing (i.e., NO in step S404), the processing routine returns to step S402 to newly read the data and wait until the switch SW1 is turned on.

In step S405, the CPU 114 controls the display device 108 to display (superimpose) a face detection frame having the size corresponding to the face image on an object image of each detected face with reference to the coordinate data memorized (stored) in the system memory section 109.

When the image data includes plural face images, a face detection frame having a largest size can be differentiated in color from other face detection frames. For example, a yellow face detection frame surrounds a largest face image and other face detection frames are orange.

In step S406, the CPU 114 determines whether the feed button 117 is operated. When the user operates the feed button 117 (i.e., YES in step S406), the CPU 114 changes the face image displayed with a yellow face detection frame (step S407).

In step S408, the CPU 114 determines whether the shutter release button 118 is fully depressed to turn on the switch SW2. When the switch SW2 is not in an ON state (i.e., NO in step S408), the processing routine returns to step S406. When the switch SW2 is in an ON state (i.e., YES in step S408), the processing routine proceeds to step S409 to memorize (register) the feature value of the face image displayed with the yellow frame in the system memory section 109 or in the memory card 111. Then, the processing routine returns to step S402.

When the memory card 111 already stores another feature value of the photographing object, the newly memorized feature value is simply added or overwritten on the old value, because the feature value newly detected in the register mode is believed to be accurate compared with the old feature value detected during the photographing processing.

The CPU 114 performs the above-described processing until the user cancels the register mode through the mode switch 116.

Next, another processing for memorizing the feature value in the feature value memorizing circuit 122 will be described with reference to the flowchart shown in FIG. 9.

Figure 9:
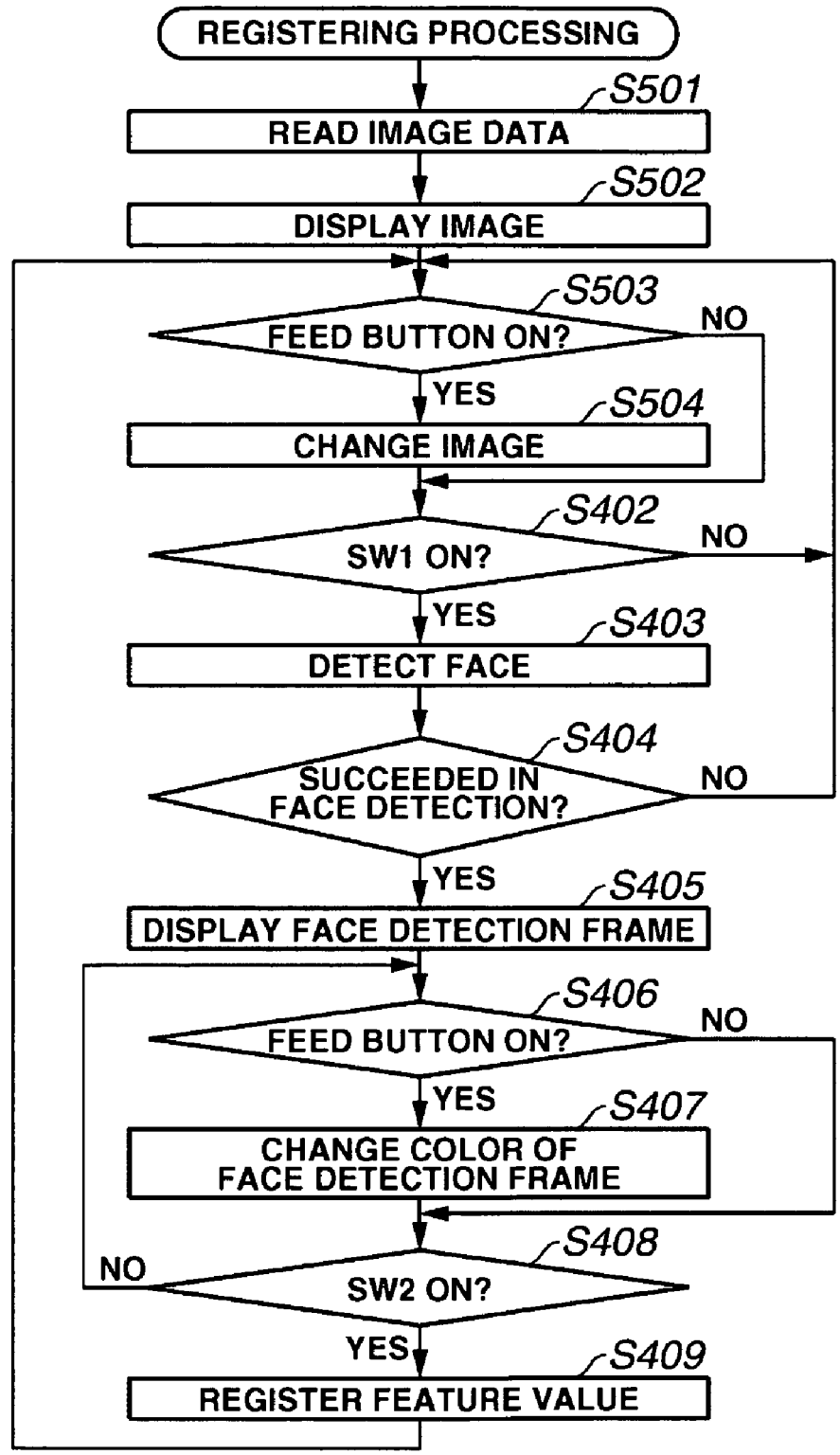
FIG. 9 is another flowchart showing the feature value registering processing.

When the user selects a playback mode through the mode switch 116 and also selects a command relating to the registration of the feature value on a menu screen, the CPU 114 starts the registering processing according to the flowchart shown in FIG. 9.

In step S501, the CPU 114 reads the photographed image data from the memory card 111.

In step S502, the CPU 114 rasterizes the readout image data in the DRAM 119 and controls the display circuit 106 to display any one of the rasterized image data on the display device 108.

In step S503, the CPU 114 determines whether the feed button 117 is operated. When the user operates the feed button 117 (i.e., YES in step S503), the processing routine proceeds to step S504 to switch the image displayed on the display device 108.

Then, in step S402, the CPU 114 determines whether the shutter release button 118 is half depressed to turn on the switch SW1. When the switch SW1 is in an ON state (i.e., YES in step S402), the processing routine proceeds to step S403. When the switch SW1 is not in an ON state (i.e., NO in step S402), the processing routine returns to step S503.

In step S403, the feature detecting circuit 121 performs the face detection processing using a parameter read from the parameter holding circuit 124, based on the display-oriented image data displayed on the display device 108, to calculate a feature value. When the image data includes plural face images, a feature value is calculated for each face image.

In step S404, the CPU 114 determines whether it has succeeded in the face detection processing of step S403. When the CPU 114 succeeded in the face detection processing (i.e., YES in step S404), the processing routine proceeds to step S405. When the CPU 114 has failed in the face detection processing (i.e., NO in step S404), the processing routine returns to step S503 to newly read the data and repeat the processing until the switch SW1 is turned on.

In step S405, the CPU 114 controls the display device 108 to display (superimpose) a face detection frame having the size corresponding to the face image on an object image of each detected face with reference to the coordinate data memorized in the system memory section 109.

When the image data includes plural face images, a face detection frame having a largest size can be differentiated in color from other face detection frames. For example, a yellow face detection frame surrounds a largest face image and other face detection frames are orange.

In step S406, the CPU 114 determines whether the feed button 117 is operated. When the user operates the feed button 117 (i.e., YES in step S406), the CPU 114 changes the face image displayed with a yellow face detection frame (step S407).

In step S408, the CPU 114 determines whether the shutter release button 118 is fully depressed to turn on the switch SW2. When the switch SW2 is not in an ON state (i.e., NO in step S408), the processing routine returns to step S406. When the switch SW2 is in an ON state (i.e., YES in step S408), the processing routine proceeds to step S409 to memorize (register) the feature value of the face image displayed with the yellow frame in the system memory section 109 or in the memory card 111. Then, the processing routine returns to step S503.

When the memory card 111 already stores another feature value of the photographing object, the newly memorized feature value can be simply added or over written on the old value, because the feature value newly detected in the register mode is believed to be accurate compared with the old feature value detected during the photographing processing.

The CPU 114 performs the above-described processing until the user selects a command canceling the processing relating to the registration of the feature on the menu screen.

When the feature value of an object is memorized based on the conditions not related to the photographing operation as shown in the flowcharts of FIGS. 8 and 9, it is desirable to clearly indicate the detected object.

Figure 10:
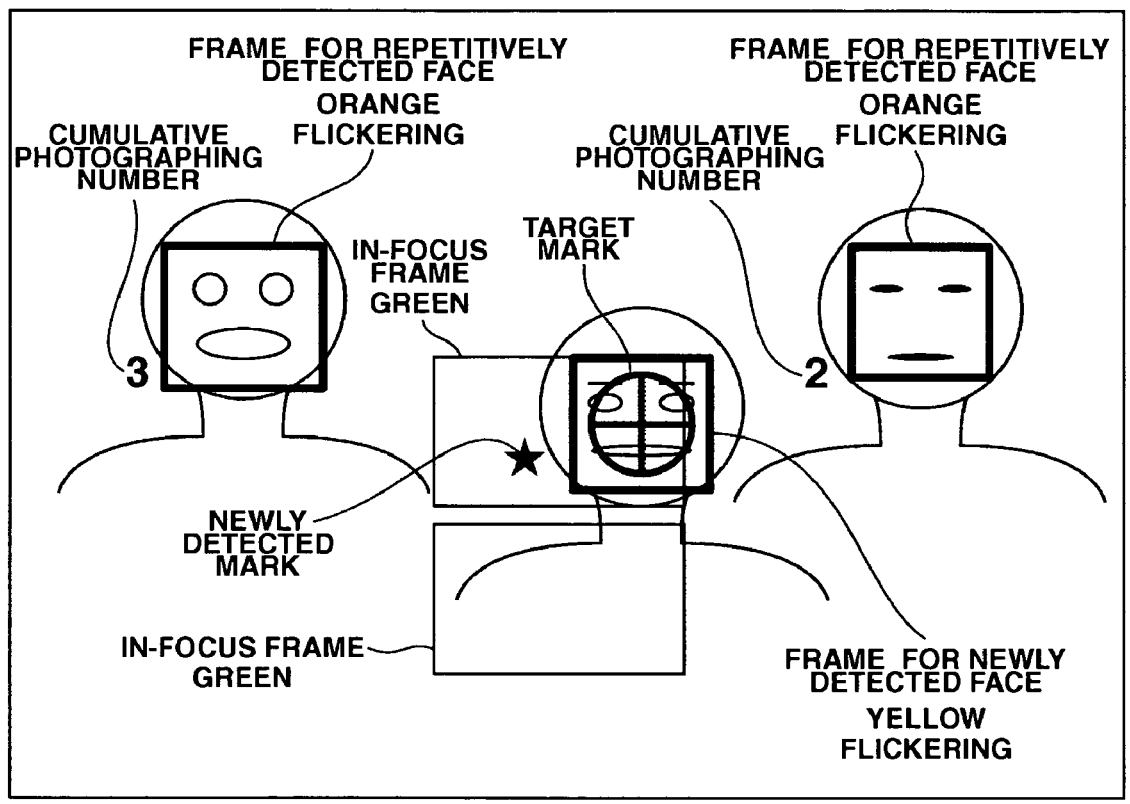
FIG. 10 shows an example of an image displayed on the display device, including a registered object whose feature value is registered in the registering processing.

Hence, a priority flag can be memorized (stored) together with the feature value. In this case, when an object corresponding to the feature value accompanied with the priority flag is detected during a photographing operation, a display pattern, e.g., as shown in FIG. 10, can be used to highlight or emphasize the display of the priority object compared with the display of other objects.

With this display, the user can clearly identify the priority object displayed on the display device 108 and will not miss the opportunity to take a picture of the priority object.

Fourth Embodiment

According to a fourth embodiment, other images including a selected object can be retrieved. For example, if a playback mode allowing the user to review any one of photographed images on the display device 108 is selected via the mode switch 116, an image, for example the image shown in FIG. 4, may be displayed on the display device 108. The example shown in FIG. 4 includes three detected objects. The display indicates that one of the objects has been photographed three times during a specific period of time, another one of the objects has been photographed one time during the specific period of time and one of the objects has been photographed two times during a specific period of time.

According to the fourth embodiment, a user can select one of the objects and view the other photographs including that object. For example, if the object with a cumulative number of three is selected, the user can easily view the other two photographs containing this object. For example, a cursor may be provided which the user can position over the object prior to selecting a view other images of the object function button. Alternatively, a button could be selected without first selecting an object. A screen would then prompt the user to select the desired object, e.g., via thumbnail images of the individual objects in the photograph. As another alternative, a screen (or multiple screens) having thumbnail images of each of the objects photographed during the period of time could be displayed. Such a display could also include the cumulative photographing number for each of the objects. The user could then select on of the objects and the images containing those objects could be retrieved and displayed.

FIG. 11 is an exemplary table showing data stored in the memory 111 based on each of the detected objects. For each object, feature data used for object detection (e.g., face diction) is stored as well as the cumulative number of photographs and the frames in which the object appear (the total number of frame numbers is equal to the cumulative number of photographs). The table shown in FIG. 11 is dynamically updated.

When a new picture is taken, for each of the objects, a determination is made as to whether the object matches an already stored object. If so, the cumulative photographing number is incremented and the new frame number is added to the list of frame numbers.

If there is no data in the table for an object (i.e., first time object has been detected during photographing period), a record is created for the new object. Feature value is stored, the cumulative photographing number is set to one and the frame number is stored in the frame number list.

If a frame is deleted, the frame number is deleted from the frame list and the cumulative photographing number is decremented for each of the detected objects in the deleted frame.

As described above, a thumbnail image may also be stored for each of the detected objects. The table shown in FIG. 11 may include address information for the thumbnail images for each of the detected objects.

FIG. 12 is an exemplary table containing information for each frame. The information for each frame includes a storage address for the frame, a date and time that the frame (image) was created and a shooting mode (conditions) that was used for taking the frame (image).

In the above-described embodiments, the cumulative photographing number of each photographing object is for still images. However, the display method is not limited to a particular one. For example, in a video camera, it is possible to display a photographing time, or occurrence frequency, of moving images corresponding to a photographing object.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-077161 filed Mar. 17, 2005, and No. 2006-015096 filed Jan. 24, 2006, which are hereby incorporated by reference herein in their entirety.

What is claimed is:

1. An imaging apparatus comprising:
    an imaging element configured to produce an imaging output;
    a detecting circuit configured to detect an object based on image data produced from the imaging output of the imaging element and to calculate a feature value representing a feature of the detected object;
    a storage circuit configured to store feature values of photographing objects;
    a comparing circuit configured to compare the feature value obtained by the detecting circuit with the feature value of at least one photographing object previously stored by the storage circuit; and
    a display device configured to display an image based on the image data produced from the imaging output of the imaging element,
    wherein the comparing circuit uses a feature value calculated by the detecting circuit based on the image data used to display the image on the device, in the comparison between the feature value obtained by the detecting circuit and the feature values previously stored by the storage circuit,
    wherein the comparing circuit is configured to determine whether the feature value calculated by the detecting circuit and the feature value of the photographing object previously stored in the storage circuit correspond to the same photographing object, and
    wherein the display device displays information relating to the photographing object when a comparison result provided by the comparing circuit indicates that the calculated feature value and the previously stored feature value correspond to a same photographing object.

2. The imaging apparatus according to claim 1, further comprising an operating member configured to instruct a photographing operation, wherein the storage circuit is configured to store a feature value calculated by the detecting circuit based on image data obtained in response to an action of the operating member.

3. The imaging apparatus according to claim 2, wherein, when the operating member is operated under a condition that the display device displays the image, the detecting circuit calculates the feature value based on the image data obtained in response to the action of the operating member.

4. The imaging apparatus according to claim 2, wherein the storage circuit is configured to store photographing information relating to a photographing object in addition to the feature value of the photographing object, and
    wherein, when the comparing circuit determines that the feature value calculated by the detecting circuit based on the image data obtained in response to the action of the operating member and the feature value of a respective photographing object previously stored in the storage circuit correspond to the same photographing object, the storage circuit stores the photographing information relating to the photographing object.

5. The imaging apparatus according to claim 4, wherein the photographing information relating to the photographing object includes a cumulative photographing number.

6. The imaging apparatus according to claim 4, wherein the photographing information relating to the photographing object includes a photographing time.

7. The imaging apparatus according to claim 4, wherein the photographing information relating to the photographing object includes information which indicates images including the photographing object.

8. The imaging apparatus according to claim 4, wherein, when the comparing circuit is configured to determine that the feature value calculated by the detecting circuit based on the image data obtained in response to the action of the operating member and the feature value of a respective photographing object previously stored in the storage circuit during a pre-designated time period correspond to the same photographing object, the storage circuit is configured to store photographing information relating to the photographing object.

9. The imaging apparatus according to claim 8, wherein, when the comparing circuit determines that the feature value calculated by the detecting circuit based on the image data used to display the image on the display device and the feature value of a respective photographing object previously stored in the storage circuit during the pre-designated time period correspond to the same photographing object, the display device is configured to display photographing information relating to the photographing object.

10. The imaging apparatus according to claim 4, further comprising a retrieval unit configured to retrieve images including a selected photographing object.

11. The imaging apparatus according to claim 1, wherein the image is a moving image.

12. A method for controlling a display device, comprising:
a detecting step of detecting an object based on image data produced from an imaging output of an imaging element and calculating a feature value representing a feature of the detected object;
a comparing step of comparing the feature value obtained in the detecting step with a previously stored feature value for at least one photographing object; and
a displaying step of displaying an image on the display device based on the image data produced from the imaging output of the imaging element,
wherein the comparing step uses a feature value calculated based on the image data used to display the image on the display device, in comparing the feature value obtained in the detecting step and the previously stored feature value for the at least one photographing object,
wherein the comparing step determines whether the calculated feature value obtained in the detecting step and the previously stored feature value of the at least one photographing object correspond to the same photographing object, and
wherein the displaying step causes the display device to display information relating to the at least one photographing object when a comparison result obtained in the comparing step indicates that the calculated feature value obtained in the detecting step and the previously stored feature value correspond to a same photographing object.

13. The method for controlling a display device according to claim 12, further comprising a storing step of storing the feature value calculated in the detecting step when it is determined in the comparing step that the feature value calculated in the detecting step does not match any previously stored feature value.

14. The method for controlling a display device according to claim 13, wherein the comparing step uses the feature value calculated in the detecting step based on the image data obtained in response to an action of an operating member instructing a photographing operation.

15. The method for controlling a display device according to claim 14, further comprising a step of, when it is determined in the comparing step that the feature value calculated in the detecting step based on the image data obtained in response to the action of the operating member and the feature value stored in the storing step correspond to the same photographing object, storing photographing information relating to the photographing object.

16. The method for controlling a display device according to claim 15, further comprising a step of, when it is determined in the comparing step that the feature value calculated in the detecting step based on the image data obtained in response to the action of the operating member and the feature value stored in the storing step during a pre-designated period correspond to the same photographing object, storing photographing information relating to the photographing object.

17. The method for controlling a display device according to claim 15, wherein the photographing information relating to the photographing object includes a cumulative photographing number.

18. The method for controlling a display device according to claim 15, wherein the photographing information relating to the photographing object includes a photographing time.

19. The method for controlling a display device according to claim 15, wherein the photographing information relating to the photographing object includes information which indicates images including the photographing object.

20. The method for controlling a display device according to claim 15, further comprising a retrieval step of retrieving images including a selected photographing object and displaying the retrieved images.

21. The method for controlling a display device according to claim 16, wherein, when it is determined in the comparing step that the feature value calculated in the detecting step based on the image data used to display the image on the display device and the feature value stored in the storing step during the pre-designated period correspond to the same photographing object, the displaying step further comprises causing the display device to display photographing information relating to the photographing object.

22. The method for controlling a display device according to claim 12, wherein the image is a moving image.

23. A method for controlling an imaging apparatus, comprising:
a producing step of producing image data by using an imaging element;
a detecting step of detecting an object based on the image data produced in the producing step and calculating a feature value representing a feature of the detected object;
a comparing step of comparing the feature value obtained in the detecting step with a previously stored feature value for at least one photographing object to determine whether the calculated feature value obtained in the detecting step and the previously stored feature value correspond to the same photographing object; and
a storing step of updating and storing photographing information relating to the photographing object when it is determined in the comparing step that the calculated feature value obtained in the detecting step and the previously stored feature value of the at least one photographing object correspond to a same photographing object.

24. The method for controlling an imaging apparatus according to claim 23, further comprising a step of generating a thumbnail image of the photographing object from the image data produced in the producing step and storing the thumbnail image in correlation with the photographing information.

25. The method for controlling an imaging apparatus according to claim 24, further comprising:
a selecting step of selecting the photographing object via the thumbnail image; and
a retrieval step of retrieving images including the selected photographing object.

26. The method for controlling an imaging apparatus according to claim 23, wherein the photographing information relating to the photographing object includes a cumulative photographing number.

27. The method for controlling an imaging apparatus according to claim 23, wherein the photographing information relating to the photographing object includes a photographing time.

28. The method for controlling an imaging apparatus according to claim 23, wherein the photographing information relating to the photographing object includes information which indicates images including the photographing object.

29. The method for controlling an imaging apparatus according to claim 23, further comprising a storing step of storing the feature value calculated in the detecting step when it is determined in the comparing step that the feature value calculated in the detecting step does not match any previously stored feature value.

* * * * *